Jan. 17, 1961 R. L. CARTER 2,968,248
MAGNETIC DRIVE IMPELLER PUMP
Filed Dec. 16, 1957 2 Sheets-Sheet 2

INVENTOR.
Robert L. Carter
BY
J. W. Lovett
ATTORNEY

United States Patent Office 2,968,248
Patented Jan. 17, 1961

2,968,248

MAGNETIC DRIVE IMPELLER PUMP

Robert L. Carter, Flint, Mich., assignor to General Motors Corporation, Detroit, Mich., a corporation of Delaware Filed Dec. 16, 1957, Ser. No. 703,142

1 Claim. (Cl. 103—87)

This invention relates to pumps and more particularly to impeller type pumps suitable to force liquid such as engine fuel under pressure from a supply tank.

It has heretofore often been the practice to install fuel pumps of the impeller type in fuel tanks with the intake to the pump positioned to be immersed near the bottom of the tank and the axes of the pump and its driving motor being vertically arranged. In such installations difficulties have been encountered in providing adequate bearings for the support of the rotating parts. In attempts to supply a reliable step bearing of adequate load bearing capacity for the impeller, such bearings have heretofore been found to interfere with the fluid flow and thereby reduce the effectiveness of the pumping action. It has been found desirable, however, to provide a large step bearing in order to retain close tolerances necessary for prolonged pumping effectiveness as well as to promote smoothness in operation—this provision being dependent upon an avoidance of interference with the fluid flow.

An object of the present invention is to provide a pump having an impeller supported on a bearing of large load capacity, the fluid flow characteristics of the pump being improved by close tolerances in the assembly. Another object is to provide an improved impeller pump of compact and simple construction having a minimum of fluid flow interference.

A feature of the present invention is an impeller mounted on a bearing of substantial radial dimension or rugged construction and which is spaced from the path of fluid to be driven through the pump. Another feature is an impeller provided with a bearing arranged interiorly thereof. Still another feature is a rotative impeller including an annular sintered permanent magnet surrounding a supporting bearing.

These and other important features of the invention will now be described in detail in the specification and then pointed out more particularly in the appended claim.

Figure 1:
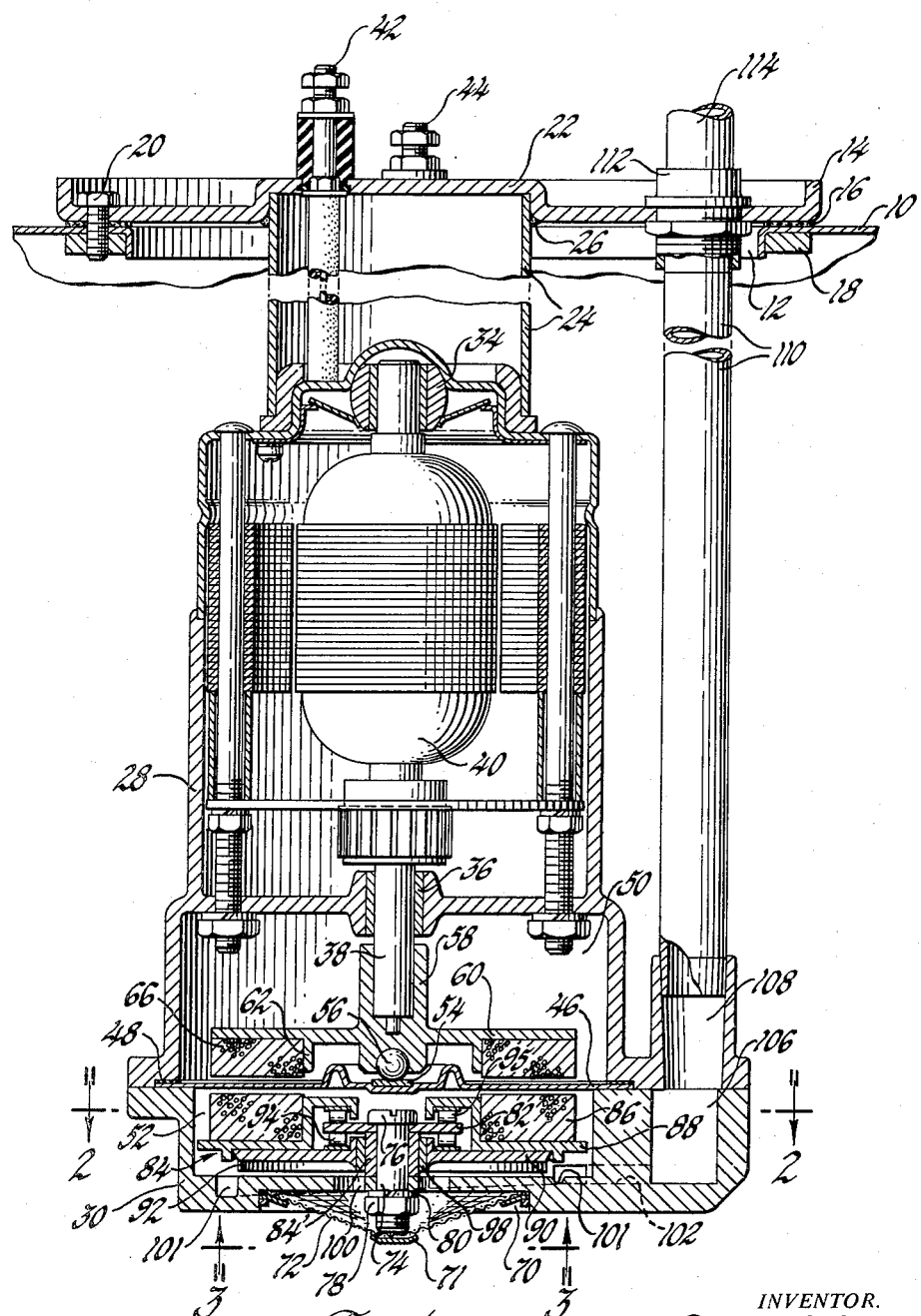
Fig. 1 is a sectional view of a pump in which the present invention is embodied, the pump being shown as suspended from the top of a tank.
Figure 2:
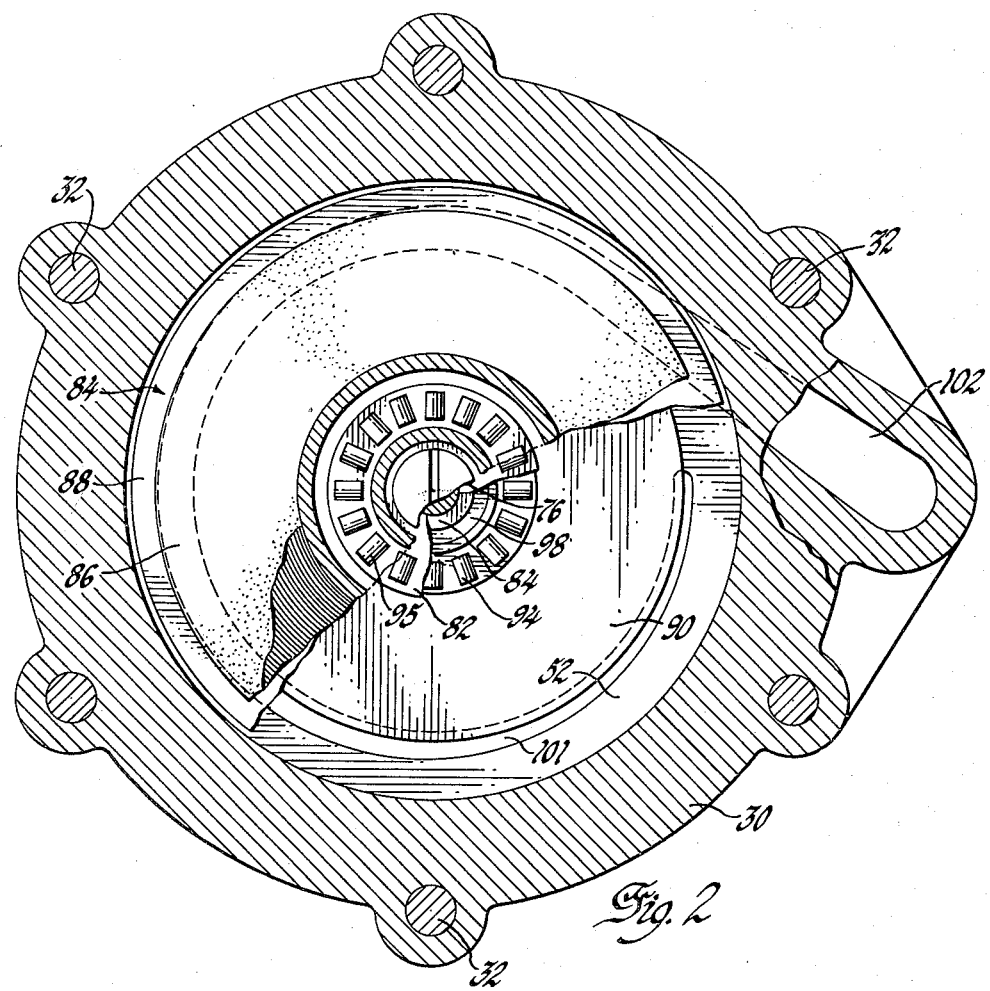
Fig. 2 is an enlarged and sectional view looking in the direction of the arrows 2—2 in Fig. 1.

The present invention is disclosed as embodied in a pump employing annular permanent magnets as driving and driven members. Magnets of this type are produced in a sintering operation and may vary considerably in composition. Such a magnet is disclosed in the British Patent 758,962 published October 10, 1956, as relating to "Cylindrical Anisotropic Permanent Magnets." It will be appreciated, however, that other types of magnets may be used without departing from the spirit of the present invention. Accordingly, a further description of the magnets involved is not here given except to state that each magnet is in the form of a ring with sections of alternating polarity arranged about the ring axis. The magnets could be U-shaped but a ring form is preferred. Obviously, the magnet materials should be such as to be unaffected by the fluids or the heat conditions of any given specific field of use to which a particular pump is to be applied.

Heretofore it has been known to suspend a fuel pump and its power actuating means in the form of an electric motor from the top of the tank. Such an arrangement is shown in the United States Patent 2,139,370 granted December 6, 1938, in the names of C. J. Lauer and R. C. Bowers. In the present instance the method of mounting the pump with respect to a tank is of no particular significance insofar as the present invention is concerned. The present invention is particularly related to the pump itself. Insofar as the mounting of the present disclosure is concerned, it will be seen that, in Fig. 1, the top of a fuel tank is illustrated at 10, the tank being provided with a flanged opening 12 over which is fixed a cover plate 14. A sealing gasket 16 is interposed between the tank 10 and the cover plate. A reinforcement ring 18 is placed around the flanged opening 12 and is fixed to the cover plate 14 by a series of spaced bolts such as the bolt 20. Fixed to a recess in the underside of a central portion 22 of the plate 14 is the upper end of a vertical support tube 24. The attachment is by way of welding 26. This tube is so arranged as to support a casing 28 the bottom of which comprises a pump casing portion 30. The two casing parts are joined by means of six bolts 32. The casing 28 is fitted with two bearings 34 and 36 in which is journaled the shaft 38 of a motor armature 40. Terminals 42 and 44 are arranged in insulated relation with respect to the cover plate 14 so that current may be conveyed to the motor for its operation, as will be understood.

The casing 28 bears a diaphragm 46 of brass which is interposed between the casing portion 30 and the main body of the casing 28. A sealing washer 48 serves to form a liquid tight connection at the non-magnetic diaphragm. The latter serves to divide the interior of the casing 28 into two compartments 50 and 52. The central portion of the diaphragm 46 is fitted with a hardened steel plate 54 against which a ball bearing 56 is adapted to rest. This bearing is held in a recess formed in the hub 58 of a disk member 60. The latter is flanged as at 62 better to retain an annular anisotropic permanent magnet 66 of the type heretofore mentioned.

The bottom wall of the casing or casing portion 30 is recessed as at 70 suitably to receive a conical frame 71 and screen 72, the central portion of the screen being held outwardly by the end of a bolt 74. The latter is provided with a kerfed head 76 and, with the help of a nut 78 and a spring washer 80, serves to hold an annular bearing plate or washer 82 and a cylindrical bushing 84' in fixed non-rotative relation and in coaxial position with respect to the annular magnet 66.

Figure 3:
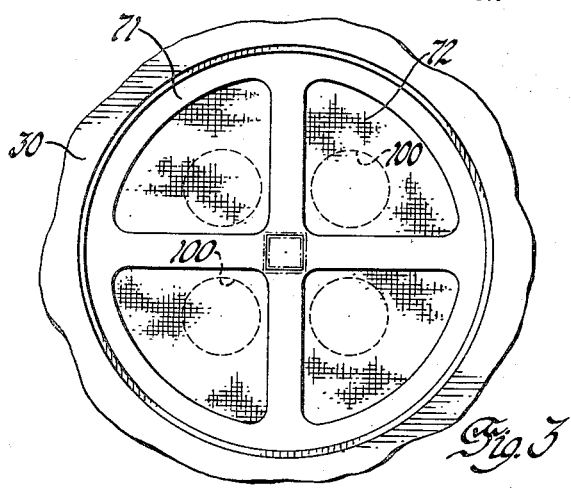
Fig. 3 is a view looking in the direction of the arrows 3—3 in Fig. 1.

An impeller generally indicated at 84 comprises an annular magnet 86 which is similar in construction to the magnet 66. It also includes a plate 88 and a vaned plate 90 with the underside of the latter having outwardly curved vanes 92 thereon. The inner peripheries of the plate 88 and the vane plate 90 cooperate to enclose annular roller bearing means 94 and 95 in such positions as to cause the latter to bear against the opposite faces of the bearing plate or washer 82. The plate 90 is apertured tightly to receive a cylindrical bearing 98 which is adapted to rotate on the bushing 84'. Inlets 100 leading to the compartment 52 are shown in Figs. 1 and 3. An outlet for the pump casing begins as an arcuate groove 101 in the upper side of the bottom wall of the pump casing. This outlet is shown at 102 as leading horizontally from the periphery of the vane plate 90 and then upwardly by means of a passage 106 in the casing portion 30 to a passage 108 formed in the main body of the pump casing. The passage 108 in the casing 28 is connected by means of a pipe 110 to a coupling arrangement 112 which communicates with a conduit 114 leading to the fuel system of the engine.

Assuming that current is supplied to the motor within the casing 28, the shaft 38 will serve to rotate the magnet 66. The motor armature, as well as the driving plate 60 and the magnet 66, will be supported by the ball 56 resting on the hardened plate 54. The annular ridge at the central portion of the diaphragm 46 serves to retain lubricant assuring proper smooth action of this portion of the device.

With rotation of the magnet 66, the magnet 86 will be caused to rotate with it by virtue of the flux lines or magnetic attraction set up between the two magnets. It is essential that the magnets be of sufficient magnetic strength that they will attract each other with such force that the work load given to the pump will not cause the magnets to fall out of phase. With a rotation of the second magnet 86, the vanes 92 will produce an outward flow of fluid as the latter enters through the inlets 100 and force that fluid out through the passage 102 and the vertical pipe 110 and conduit 114.

It will be noted that the bearings 94 and 94 are large and capable of firmly supporting the impeller 84 thereby permitting small tolerances between the moving and fixed parts. It is also to be noted that the bearing arrangements 94 and 95 are surrounded by or enclosed within the second magnet 86 and are spaced from the path of fluid as the latter flows into the pump casing and toward and between the vanes 92.

I claim:

A pump including a casing, an imperforate nonmagnetic diaphragm dividing the interior of said casing into a motor drive compartment and a pumping chamber, first annular magnetic means rotatively supported to rotate in said motor drive compartment in a plane parallel with and adjacent to said diaphragm as a pump driving means, a driven pump impeller having other annular magnetic means carried on a support member and arranged to rotate in said pumping chamber by virtue of the magnetic attraction set up between the said first and other magnetic means, bearing means including radial and axial bearing portions spaced from said diaphragm, said axial bearing portion comprising a plate lying in the plane of said other magnetic means and parallel with said diaphragm and fixed to said casing and antifriction means bearing against opposite faces of said plate and enclosed by said support member and said impeller for retaining said impeller against axial displacement, said radial bearing portion comprising means arranged to retain said impeller against radial displacement and lying in substantially the same plane as said impeller, radial vanes on said impeller facing away from said diaphragm, an outlet in said casing near and leading from the periphery of said pumping chamber and extending from the outer ends of said vanes, and an inlet in said casing near the axis of said bearing means and leading to that zone of the pumping chamber in which the inner ends of said vanes are located.

References Cited in the file of this patent

UNITED STATES PATENTS

| | | |
|---|---|---|
| 667,633 | Perkins | Feb. 5, 1901 |
| 705,839 | Henderson | July 29, 1902 |
| 2,386,505 | Puchy | Oct. 9, 1945 |
| 2,481,172 | Staggs | Sept. 6, 1949 |
| 2,638,558 | Rankin | May 12, 1953 |
| 2,779,513 | Dickey | Jan. 29, 1957 |
| 2,815,717 | Szwargulski | Dec. 10, 1957 |